US009927602B2

(12) United States Patent
Benedetti

(10) Patent No.: US 9,927,602 B2
(45) Date of Patent: Mar. 27, 2018

(54) CONFOCAL MICROSCOPY METHODS AND DEVICES

(71) Applicant: CNR CONSIGLIO NAZIONALE DELLE RICERCHE, Rome (IT)

(72) Inventor: Pier Alberto Benedetti, Pisa (IT)

(73) Assignee: CNR CONSIGLIO NAZIONALE DELLE RICERCHE, Rome (IT)

( * ) Notice: Subject to any disclaimer, the term of this patent is extended or adjusted under 35 U.S.C. 154(b) by 610 days.

(21) Appl. No.: 14/388,023

(22) PCT Filed: Mar. 27, 2013

(86) PCT No.: PCT/IB2013/052476
§ 371 (c)(1),
(2) Date: Sep. 25, 2014

(87) PCT Pub. No.: WO2013/144891
PCT Pub. Date: Oct. 3, 2013

(65) Prior Publication Data
US 2015/0097942 A1  Apr. 9, 2015

(30) Foreign Application Priority Data
Mar. 31, 2012  (IT) ................ PI2012A0034

(51) Int. Cl.
*H04N 9/47* (2006.01)
*H04N 7/16* (2011.01)
*G02B 21/00* (2006.01)

(52) U.S. Cl.
CPC ....... *G02B 21/0072* (2013.01); *G02B 21/008* (2013.01); *G02B 21/0032* (2013.01); *G02B 21/0044* (2013.01); *G02B 21/0076* (2013.01)

(58) Field of Classification Search
CPC ............ G02B 21/0072; G02B 21/0032; G02B 21/0044
(Continued)

(56) References Cited

U.S. PATENT DOCUMENTS 6,016,367 A * 1/2000 Benedetti ............. G02B 21/004
382/275
2004/0238731 A1  12/2004 Nishiyama
(Continued)

FOREIGN PATENT DOCUMENTS

EP          0833181 A1    4/1998

OTHER PUBLICATIONS

International Search Report dated Sep. 27, 2013, corresponding to International Patent Application PCT/IB2013/052476.

*Primary Examiner* — Jorge L Ortiz Criado
*Assistant Examiner* — Amir Shahnami
(74) *Attorney, Agent, or Firm* — Ladas & Parry LLP

(57) ABSTRACT

A video-confocal microscopy method for creating an image of an optical section ($\pi$) of a sample (99), provides, in one aspect of the invention, illuminating the sample (99) with illumination beams (19) concentrated on spots (x,y) arranged in an illumination pattern (18) in an illumination plane ($\alpha_o$) at the optical section ($\pi$); translationally parallel moving the pattern (18) of spots (x,y) to a plurality of positions in the illumination plane; it also provides for each position (u,v) of the illumination pattern (18), receiving light (21) returned by the sample (99) by reflection and/or transmission and/or phosphorescence, and detecting raw images (52), each having a light intensity distribution $I_{u,v}(x,y)$ on said image detector.

33 Claims, 9 Drawing Sheets

(58) Field of Classification Search
USPC .......................................................... 348/80
See application file for complete search history.

(56) References Cited

U.S. PATENT DOCUMENTS

2005/0163390 A1 7/2005 Chiang
2010/0303386 A1 12/2010 Enderlein

* cited by examiner $\beta_+$
$(x,y,+\delta)$
$I_+(x,y,Z)$ $\beta$
$(x,y,0)$
$I(x,y,Z)$ $IB(x,y,Z) = I(x,y,Z) - k \mid I_{-\delta}(x,y,Z) - I_{+\delta}(x,y,Z)$ $\beta$
$(x,y, -\delta)$
$I_-(x,y,Z)$

CONFOCAL MICROSCOPY METHODS AND DEVICES

This application is a 371 of PCT/IB2013/052476, filed on Mar. 27, 2013, which claims priority to Italian Application No. PI2012A000034, filed Mar. 31, 2012.

FIELD OF THE INVENTION

The present invention relates to confocal optical microscopy methods, with particular reference to video-confocal microscopy, and also relates to devices for carrying out such methods.

BACKGROUND OF THE INVENTION

Technical Problems

As well known, confocal microscopy is a microscopic imaging technique that comprises a narrow-field illumination of a sample and a narrow-field capture of the light coming from the sample at the illuminated zone, i.e. a spot.

Optical video-confocal microscopy technique uses a narrow-field illumination of the sample, and a wide-field capture of the light coming from the sample, followed by a mathematical processing of the data, in order to emulate narrow-field capture.

More in detail, with reference to FIG. 1, a video-confocal technique comprises the steps of:
- multiple narrow-field illumination of a sample 99, wherein a plurality of light beams 19 is concentrated on a focus plane $\alpha$ of sample 99, in order to illuminate a plurality of spots 17 at a portion to be examined of sample 99, where spots 17 are arranged in a distribution, i.e. in an illumination pattern, normally in an ordered pattern, even if a random pattern is also possible;
- scanning sample 99 by the above multiple illumination, by laterally moving the illumination pattern to a plurality of positions (u,v) of the illumination pattern with respect to sample 99, in order to illuminate different spots, in such a way each spot is interposed between two consecutive previously illuminated spots 17. For instance, in the case of an ordered pattern, the scanning may be carried out along directions u,v parallel to focus plane $\alpha$;
- for each position (u,v) reached by the illumination pattern, collecting raw images 52 described by a function $I_{u,v}(x,y)$ that represents the light intensity distribution on an image detector 40, versus the position (u,v). Therefore, a set of such raw images 52 is obtained with the scanning step, each image referred to a couple of values u,v;
- computing a final image I(x,y) by a raw images 52 combination algorithm. The algorithm is usually selected to most reliably reproduce the details of the sample.

In particular, EP 0833181 describes methods for calculating video-confocal microscopy images, in which algorithms are used such as:

$$I(x,y)=K[\max(x,y)-\min(x,y)-2\text{Avg}(x,y)],$$

wherein max(x,y), min(x,y) and Avg(x,y), for each mode of lighting versus the position u,v, are images formed by the maximum values, by the minimum values and by the average values, respectively, of the light intensity, for each couple x,y of coordinates, where K is a gain factor that depends upon the shape of the spots.

EP0833181 also describes a video-confocal microscopy device for forming the raw images, and for carrying out the above described method.

However, this process, like others of the prior art, has some drawbacks.

In fact, in the video-confocal microscopy techniques, the noise, and/or a too low number of few raw images, can cause artifacts in the obtained images, such as "spurious patterning", which would worsen the performance.

However, increasing the scan density would extend the duration of the analysis, and photomodifications of the sample would be also possible. Therefore, the scan density should not exceed a reasonable limit.

Furthermore, the actual confocal and video-confocal techniques can provide an axial resolution power that is much lower than the lateral resolution power, even at the highest apertures. This depends upon diffraction effects and upon the microscope far-field configuration. This limitation makes it difficult to obtain images that can represent at best thin optical sections, which are necessary for accurately investigating the three-dimensional features of thick samples.

Normally, an increase of the spatial resolution power is desirable especially in biology and in medicine, typically in ophthalmology, dermatology, endoscopy, but also in the field of material investigation, in such fields as microelectronics, nanotechnologies, worked surfaces, non-destructive tests etc.

From US 20040238731 A1 and US 20040238731 A1 microscopy techniques and microscopes are known, in which steps are provided of axial displacement of the focus plane and deep investigation of the samples. However, these techniques and microscopes cannot provide a particularly high image resolution. More in detail, the apparatus of US 20040238731 A1 uses algorithms for obtaining, in particular, chromatic and spatial data of the sample by exploiting the chromatic aberration of its optics. The apparatus of US 20050163390 A1 is used for comparing low resolution optical sections in order to reconstruct the structure of thick samples by physically overturning the samples and by scanning them twice, in opposite directions, and can be used only for particular types of samples.

SUMMARY OF THE INVENTION

It is therefore a feature of the invention to provide a method and a device to overcome the above-mentioned drawback, of the present confocal and video-confocal optical microscopy, in order to extend its use to technical fields in which it can become an easier and cheaper alternative to fluorescence, reflection and even transmission microscopy techniques.

It is a particular feature of the invention to provide a method and a confocal or video-confocal microscopy device that has a better resolution power with respect to what can be obtained at present.

It is another particular feature of the invention to provide a video-confocal microscopy method and device that provide a finer spatial resolution even starting from raw images that have a low signal/noise ratio.

It is also particular feature of the invention to provide a video-confocal microscopy method and device that provide a finer spatial resolution even starting from a relatively low number of raw images, i.e. by a relatively low scan density.

It is then particular feature of the invention to provide a video-confocal or confocal microscopy method and device that provide an axial resolution power similar to the lateral resolution power, or in which the axial resolution power differs from the radial resolution power less than in the prior art.

These and other objects are achieved by a video-confocal microscopy method for creating an image of an optical section of a sample, the method comprising the steps of:

illuminating a sample by a plurality of light beams concentrated on a plurality of spots of an illumination plane $\alpha_0$ selected at the optical section, the spots arranged according to an ordered or random illumination pattern;

scanning the sample with said light beams in the illumination plane, the step of scanning comprising translationally moving the illumination pattern according to directions u,v parallel to the illumination plane, sequentially bringing the illumination pattern to a plurality of positions in the illumination plane, such that different zones are illuminated, each zone interposed between two previously illuminated consecutive zones, the step of scanning having a predetermined scan density;

for each position u,v of the illumination pattern in the illumination plane, collecting the light emitted by the sample in a region between two previously illuminated consecutive zones comprising the spots, in response to the light beams. The light emitted from the sample may be light reflected and/or transmitted and/or fluorescent coming from the sample;

for each position of the illumination pattern, collecting raw images at a detector comprising light detector elements arranged according to coordinates x,y, each raw image described by a light intensity distribution function $I_{u,v}(x,y)$ on the image detector;

computing a final image $IA_h(x,y)$ starting from the raw images $I_{u,v}(x,y)$.

In a first aspect of the invention, the step of computing the final image comprises executing an algorithm configured for calculating, for each light detector element, at least one value of a central moment of order $\geq 3$ of the light intensity distribution, the central moment of order $\geq 3$ having at each coordinate x,y a value that depends upon the asymmetry of the intensity values distribution of each raw image versus the position of the illumination pattern, wherein the central moment is defined as:

$$m_h(x,y)=\text{Avg}\{[I_{u,v}(x,y)-\text{Avg}(I_{u,v}(x,y))]^h\}, \quad [1]$$

wherein:

h is an integer number $\geq 3$;

$\text{Avg}(I_{u,v}(x,y))$ is the average of the intensity value distribution $I_{u,v}(x,y)$, i.e. it is equal to $(\Sigma_{u,v} I_{u,v}(x,y))/(U \times V)$, u=1 ... U, v=1 ... V.

wherein $\text{Avg}(I_{u,v}(x,y))$ is, for each light detector element of said detector, the average of the intensity obtained for all the positions u,v of said illumination pattern.

This way, the final image takes higher values at the coordinates x,y of the light detector elements that correspond to positions at which critically focused sample portions are present.

In other words, the moments of order $h \geq 3$, which are used in the algorithm for computing the final video-confocal image, contain light intensity distribution data that allow to take into account the symmetry/asymmetry degree of the light intensity distribution at each pixel, i.e. at each light detector element of the detector, versus the position u,v of the illumination pattern.

The pixels, i.e. the detector elements of the detector, at which there is a higher asymmetry of the light intensity distribution correspond to sample portions that are critically focused, i.e. they correspond to sample portions that have a higher density, and/or to sample portions that emanate a higher brightness, for instance by fluorescence, by reflection or even by transmission, which points out local unevennesses and specific features of these sample portions.

Therefore, the above-mentioned critically focused sample portions are highlighted as more bright portions in the final confocal image.

Therefore, if central moments of the light intensity distribution are used to calculate the final image, according to the invention, better performances can be achieved than by prior art methods.

The light beams may generally include waves over a wide range of the electromagnetic spectrum, even if most current applications of confocal and video-confocal microscopy use wavelengths between the infrared and the near-UV range. Therefore, the expression "light" is to be understood in a broad sense, and also comprises waves out of the visible range. For the same reason, also the word "microscopy", and the like, as used in this text, may have a wider meaning, which includes high resolution image capture techniques, i.e. high resolution imaging techniques, if the used wavelength is taken into account.

In an exemplary embodiment, the algorithm for computing the final image is defined by the equation:

$$IA_h(x,y)=m_h(x,y)/[m_2(x,y)]^{(h-1)/2}. \quad [2]$$

wherein:

$m_2(x,y)=\text{Avg}\{[I_{u,v}(x,y)-\text{Avg}(I_{u,v}(x,y))]^2\}$;

$m_h(x,y)$ is a value of a central moment of order h of said light intensity distribution.

In other words, in this exemplary embodiment the final image $IA_h(x,y)$ is obtained by calculating, for each light detector element of the image detector, i.e. at each pixel of coordinates x,y, the ratio between:

the value of a central moment $m_h(x,y)$ of order $h \geq 3$ of the light intensity distribution, versus the position u,v of the illumination pattern, and a power of the variance $m_2(x,y)$ of the distribution, of exponent $(h-1)/2$.

The value of the central moment may be calculated by formula [1] directly, or by formulas relating the central moments to the simple moments, which are well known to a person skilled in the art to which the invention relates.

Advantageously, the step of computing the final image is carried out by an algorithm defined by formula [2], wherein h=3, i.e. by the formula:

$$IA_3(x,y)=m_3(x,y)/m_2(x,y) \quad [3]$$

In fact, it has been noticed that formula [3] makes it possible to obtain images that have a finer spatial resolution with respect to the prior art, and that have fewer random irregularities and are less affected by patterning effects due to a possible spatial incoherence of the scan pattern, in particular the scan ordered pattern, i.e. the distance between adjacent u,v positions, with respect to the matrix of the light detector elements, i.e. the pixels of the image detector, which normally occurs due to the step-by-step scanning of video-confocal microscopy, and makes it possible to obtain images that are less affected by such effects as the Moiré effect and the like.

As described above, the typical asymmetry of the light intensity distribution $I_{u,v}(x,y)$ is particularly sensitive to the presence of critically focused sample portions, in particular it is sensitive to the presence of a material that is particularly concentrated in determined regions.

More in detail, images are obtained that have a resolution comparable or higher than what is allowed by the prior art techniques, in which the final image is obtained, for instance, through the algorithm:

$$I(x,y)=K[\max(x,y)-\min(x,y)-2\mathrm{Avg}(x,y)] \qquad [3]$$

to which EP 0833181 relates.

In alternative, or in addition, the step of computing the final image may be carried out by an algorithm still defined by formula [2], wherein the order h is an odd integer number ≥5.

In fact, the moments of odd order h, normally take particularly into account the asymmetry of the light intensity distribution at the light detector elements, i.e. at the pixels of the detector, versus the position u,v of the illumination pattern. As described above, this is relevant to detect the position of critically focused sample portions, through portions of the final image that have a particularly high light intensity.

Furthermore, provided the scan density and the signal-noise ratio are higher than predetermined values, the moments of odd order higher than 3 makes it possible to obtain more detailed data, the higher the order h is, provided the scan density, i.e. the distance between adjacent positions of the illumination pattern is suitably high.

In particular, the step of computing the final image is carried out by an algorithm defined by formula [2], wherein the order h is selected among 5, 7 and 9, i.e. the step of computing is carried out through a formula selected from the group consisting of:

$$IA_5(x,y)=m_5(x,y)/[m_2(x,y)]^2 \qquad [4]$$

$$IA_7(x,y)=m_7(x,y)/[m_2(x,y)]^3 \qquad [5]$$

$$IA_9(x,y)=m_9(x,y)/[m_2(x,y)]^4 \qquad [6].$$

In a possible exemplary embodiment, this algorithm is expressed by a combination of values of central moments of the light intensity distribution, in particular by a linear combination that is expressed by the equation:

$$IA(x,y)=\Sigma_{i=H'\ldots H''}[c_i\cdot m_i(x,y)/[m_2(x,y)]^{(i-1)/2}] \qquad [7]$$

Wherein:
H', H" are integer numbers,
$c_i$ are coefficient, at least one of which is different from zero;
$m_i(x,y)$ is value of a central moment of order i of the light intensity distribution;
$m_2(x,y)=\mathrm{Avg}\{[I_{u,v}(x,y)-\mathrm{Avg}(I_{u,v}(x,y))]^2\}$.

In particular, the use of the linear combination defined by equation [7] turned out to be useful for minimizing the patterning due to Moiré effect and to the step-by-step scanning.

Naturally, also in the case of formulas [3]-[7], the values of the central moments may be directly calculated from equation [1], or by the above-mentioned formulas that relates the central moments to the simple moments.

In an exemplary embodiment of the invention, the method comprises a step of:
selecting a plurality of further illumination planes $\alpha_j$ proximate to the optical section of interest, comprising at least two further illumination planes that are arranged at opposite sides of the optical section, the further illumination planes located at respective distances $\delta_j$ from the optical section that are shorter than a predetermined maximum distance,
wherein, for each further illumination plane $\alpha_j$, the method comprises the steps of:

illuminating the sample by a plurality of light beams concentrated on a plurality of spots of each further illumination plane, the spots arranged in a respective ordered or random illumination pattern;
scanning the sample with said light beams in the illumination plane, comprising translationally moving the respective illumination pattern according to directions u,v parallel to the further illumination plane $\alpha_j$, sequentially bringing the respective illumination pattern to a plurality of positions in the further illumination plane;
for each position $(u,v,w_j)$ of the respective illumination pattern in the further illumination plane, collecting the light emitted by the sample in a region comprising the spots of the further illumination plane, in response to said light beams;
for each position of the respective illumination pattern, collecting further raw images, each further raw image described by a light intensity distribution function $I_{u,v,w_j}(x,y)$ on the image detector;
computing a provisional image $IA_{h,j}(x,y)$ associated to the further illumination plane, starting from the respective further raw images,
wherein the step of computing a provisional image comprises executing an algorithm that provides computing a value of a central moment of order ≥3 of the light intensity distribution. Similarly to equation [1], in this case the central moment of order h may be calculated according to the definition, i.e. through the formula:

$$m_{h,j}(x,y)=\mathrm{Avg}\{[I_{u,v,w_j}(x,y)-\mathrm{Avg}(I_{u,v,w_j}(x,y))]^h\} \qquad [1'];$$

wherein:
h is an integer number ≥3;
$\mathrm{Avg}(I_{u,v,w_j}(x,y))$ is the average of the intensity value distribution,
$\mathrm{Avg}(I_{u,v,w_j}(x,y))=[\Sigma_{u,v}I_{u,v,w_j}(x,y)]/U\times V$, u=1 . . . U, v=1 . . . V, for each further illumination plane $\alpha_j$,
wherein, in alternative, the value of the central moment may be calculated by the above-mentioned formulas relating the central moments to the simple moments;
computing a final image IB(x,y) as a combination of the provisional images.

The use of provisional images comprising images that relate to above-focus planes and to below-focus planes in order to calculate the final image allows an axial resolution higher than what is allowed by the prior art methods.

Therefore, not only the amount, but also the quality of the obtained data is improved, and not only in a lateral but also in an axial displacement of the illumination pattern, i.e. in a displacement about the optimum focus position. In fact, optical sections are obtained remarkably thinner than what it is allowed by the prior art methods. This is particularly advantageous for studying thick objects.

Advantageously, the maximum distance of the further illumination planes from the optical section is the same order of magnitude as the wavelength of the light beams.

In an advantageous exemplary embodiment, a step is provided of translationally moving a same illumination pattern according to a direction w transverse to the optical section, in particular according to a direction which is orthogonal to the optical section, wherein this same illumination pattern is sequentially shifted between the illumination plane arranged at the optical section and each of the further illumination planes $\alpha_j$, and said step of scanning the sample is sequentially carried out along each of the illumination planes.

In particular said plurality of further illumination planes comprises only the two further illumination planes that are arranged at opposite sides of the optical section, in particular at about the same distance from the optical section.

In this case, a combination of the provisional images is preferably defined by the equation:

$$IB(x,y)=IA(x,y)-k|IA_-(x,y)-IA_+(x,y)| \quad [8]$$

wherein $IA_-(x,y)$ and $IA_+(x,y)$ are provisional images of the two planes $\alpha_-,\alpha_+$ that are arranged at opposite sides of the optical section, and k is a correction coefficient preferably set between 0.5 and 1.

For example, the provisional images may be calculated, in particular, by formulas that are similar to equation [2]:

$$IA_+(x,y)=m_{h+}(x,y)/[(m_{2+}(x,y))]^{(h-1)/2} \quad [2'],$$

and $$IA_-(x,y)=m_{h-}(x,y)/[(m_{2-}(x,y))]^{(h-1)/2} \quad [2''],$$

where $m_{h+}(x,y)$ and $m_{h-}(x,y)$ are values of the central moments of order h of distributions of light intensity coming from the further illumination planes $\alpha_-$ and $\alpha_+$, respectively, and $m_{2+}(x,y)=Avg\{[I_{u,v,w+}(x,y)-Avg(I_{u,v,w+}(x,y))]^2\}$.
$m_{2-}(x,y)=Avg\{[I_{u,v,w-}(x,y)-Avg(I_{u,v,w-}(x,y))]^2\}$.

In alternative, the provisional images may be calculated by means of respective combinations of values of central moments of the light intensity distribution, in particular by means of linear combinations that may be obtained from equation [7]:

$$IA_+(x,y)=\Sigma_{i=H'\ldots H''}[c_i \cdot m_{i+}(x,y)/[m_{2+}(x,y)]^{(i-1)/2}] \quad [7'],$$

and $$IA_-(x,y)=\Sigma_{i=H'\ldots H''}[c_i \cdot m_{i-}(x,y)/[m_{2-}(x,y)]^{(i-1)/2}] \quad [7''].$$

where $m_{i+}(x,y)$ and $m_{i-}(x,y)$ are values of the central moments of order i of intensity distribution of light coming from the further illumination planes $\alpha_-$ and $\alpha_+$, respectively.

For instance, the step of computing the final image is carried out by an algorithm defined by formula [8], wherein h=3, i.e. by the formula:

$$IB_3(x,y)=IA_3(x,y)-k|IA_{3-}(x,y)-IA_{3+}(x,y)|. \quad [9]$$

In other exemplary cases, the step of computing the final image is carried out by an algorithm defined by formula [8], wherein h is an odd integer number ≥5. Even in this case, if the scan density and the signal-noise ratio are high enough, the values of central moments and the provisional images of higher order allows a higher lateral resolution, the higher h is. In particular, the step of computing the final image is carried out by an algorithm defined by formula [2], wherein h is selected among 5, 7 and 9.

In still other embodiments, the step of computing the final image is carried out by an algorithm defined by formula [7]:

$$IA(x,y)=\Sigma_{i=H'\ldots H''}[c_i \cdot m_i(x,y)/[m_2(x,y)]^{(i-1)/2}] \quad [7]$$

In a second aspect of the invention, the above-mentioned objects are achieved by a confocal microscopy method for creating an image of a cross section of interest of a sample, the method comprising the steps of:

selecting a group of illumination planes $\beta_j$ proximate to the section of interest, comprising at least two illumination planes $\beta_-,\beta_+$ that are arranged at opposite sides of the section of interest, the illumination planes located at respective distances $\delta_j$ from the section of interest shorter than a predetermined maximum distance;

for each illumination plane $\beta_j$, steps of:
illuminating the sample with at least one light beam concentrated on a spot of each illumination plane;
scanning the sample with such at least one light beam in the illumination plane according to directions u,v parallel to illumination plane $\beta_j$, sequentially bringing the light beam to a plurality of positions in the illumination plane;

for each position $(u,v,w_j)$ of the respective beam in the illumination plane, collecting the light emitted by the sample in a region comprising the spot of the illumination plane, in response to the at least one light beam;

for each position of the respective beam, creating a provisional image associated to the illumination plane at a light detector, the provisional image described by a light intensity distribution function $I_{u,v,w_j}(x,y)$ on the spot;

computing a final image IB(x,y) as a combination of provisional images.

The use of provisional images comprising images referring to above-focus planes and below-focus planes to calculated the final image makes it possible to obtain an axial resolution higher than what is allowed by the prior art methods.

Therefore, not only the amount, but also the quality of the obtained data is improved, and not only in a lateral but also in an axial displacement of the illumination pattern, i.e. in a displacement about the optimum focus position. In fact, optical sections are obtained remarkably thinner than what it is allowed by the prior art methods. This is particularly advantageous for studying thick objects.

These advantages can be achieved also in the field of confocal microscopy, where the information, i.e. the light coming from the sample, is directly narrow-field collected.

Advantageously, this maximum distance is the same order of magnitude as the wavelength of the light of the light beams.

In particular,
the step of illuminating is carried out by a plurality of light beams concentrated on respective spots of a plurality of spots of each illumination plane, the spots arranged in a respective illumination pattern;

the step of scanning the sample comprises translationally moving the illumination pattern according to directions u,v, in order to sequentially bringing the illumination pattern to the plurality of positions on each illumination plane;

the step of creating a provisional image comprises the steps of:
for each position $u,v,w_j$ of the respective illumination pattern, collecting a respective set of raw images at an image detector, each raw image of the respective set of raw images described by a light intensity distribution function on the image detector, each raw image associated to an illumination plane the group of illumination planes;

computing the provisional image associated to the illumination plane starting from the respective set of raw images.

In other words, the advantages of the method according to the second aspect of the invention advantages can be achieved also in the field of video-confocal microscopy, which differs from the technique of confocal microscopy for the fact of receiving the information, i.e. the light coming from the sample, to in a wide wiled, and for the fact of carrying a restriction in a narrow field analytically. As it is better explained hereinafter, such advantages can be achieved independently from the algorithm used to calculate the final image.

In a possible exemplary embodiment, a step is provided of translationally moving a same illumination pattern according to a direction w transverse to the section of interest, in particular according to a direction orthogonal to the section of interest, wherein the same illumination pattern is sequentially shifted between the illumination planes $\beta_j$, and the step of scanning the sample is sequentially carried out on each illumination plane.

Preferably, said plurality of illumination planes comprises an illumination plane selected at the section of interest.

In particular said plurality of illumination planes comprises, at a predetermined distance from said section of interest, only said two illumination planes that are arranged at opposite sides of the section of interest, in particular at about the same distance from the section of interest.

In this case, the combination is preferably defined by the equation:

$$IB(x,y)=I(x,y)k|I_-(x,y)-I_+(x,y)| \quad [10]$$

wherein $I(x,y)$ is an image calculated at illumination plane $\beta_0$, whereas $I_-(x,y)$ and $I_+(x,y)$ are provisional images of the two planes $\beta_-,\beta_+$ at opposite sides of the section of interest, and k is a correction coefficient preferably set between 0.5 and 1.

The provisional images may be calculated by an algorithm selected among the algorithms known from the confocal and video-confocal microscopy methods, such as the algorithms disclosed in EP 0833181, for example by the formula:

$$I(x,y)=K[\max(x,y)-\min(x,y)-2\text{Avg}(x,y)],$$

and similar for $I_-(x,y)$, $I_+(x,y)$, or by an algorithm defined by the formula:

$$I(x,y)=m_h(x,y)/[m_2(x,y)]^{(h-1)/2} \quad [2]$$

where the symbols have the meaning explained above, and similar for $I_-(x,y)$, $I_+(x,y)$.

In alternative, the provisional images are calculated by an algorithm defined by formulas deriving from equation [2], i.e. by the formulas:

$$IA_+(x,y)=m_{h+}(x,y)/[(m_{2+}(x,y))]^{(h-1)/2} \quad [2'],$$

and $$IA_-(x,y)=m_{h-}(x,y)/[(m_{2-}(x,y))]^{(h-1)/2} \quad [2'']$$

In alternative, the provisional images are calculated as linear combinations of central moments of the light intensity distribution, in particular they are calculated by an algorithm defined by the formulas deriving from equation [7]:

$$IA_+(x,y)=\Sigma_{i=H'\ldots H''}[c_i \cdot m_{i+}(x,y)/[m_{2+}(x,y)]^{(i-1)/2}] \quad [7'],$$

and $$IA_-(x,y)=\Sigma_{i=H'\ldots H''}[c_i \cdot m_{i-}(x,y)/[m_{2-}(x,y)]^{(i-1)/2}] \quad [7''].$$

As already described, more in general, the use of provisional images comprising images referring to above-focus planes and to below-focus planes in order to calculate the final image, according to the invention, makes it possible to obtain an axial resolution higher than what is allowed by the prior art methods.

Also in this case, the light emitted from the spots of the illumination plane may comprise reflected and/or transmitted and/or fluorescent light beams coming from the sample at such spots.

The above-mentioned objects are also attained by a confocal microscopy apparatus comprising:
a means for positioning a sample;
a means for generating at least one light beam;
a means for concentrating the at least one light beam on a spot of an illumination plane defined proximate to said means for positioning said sample;
a scanner means comprising a means for translating the at least one light beam according to directions parallel to the illumination plane, the scanner means configured for sequentially bringing the at least one light beam to a plurality of positions in the illumination plane;
a image detector, i.e. a means for collecting the light emitted by the sample in a region comprising the spot of the illumination plane, the apparatus configured for receiving light emitted as reflected and/or transmitted and/or fluorescent light;
a means for forming, for each position of the at least one light beam, a provisional image associated to the illumination plane starting from the emitted light, the provisional image described by a light intensity distribution function on the spot;
a computing means for calculating a final image starting from the provisional images;
wherein the scanner means also comprises an axial translation means for translating the at least one light beam according to a transversal direction with respect to the illumination plane, in particular according to a direction which is orthogonal to the illumination plane, bringing the at least one light beam to a plurality of further illumination planes that are located at respective distances shorter than a predetermined maximum distance,
whose main feature is that the computing means is configured for calculating the final image as a combination of a plurality of provisional images that are calculated starting from respective sets of raw images of respective illumination planes.

In a particular exemplary embodiment,
the means for generating at least one light beam is configured for generating a plurality of light beams
the means for concentrating is configured for concentrating the light beams of the plurality of light beams on a spot of the illumination plane, the spots arranged in a respective illumination pattern, such that the scanner means is configured for translating the illumination pattern according to the directions (u,v), in order to sequentially bringing the illumination pattern to the plurality of positions on each illumination plane;
the means for forming a provisional image comprises:
a means forming, for each position of the illumination pattern, a respective set of raw images at an image detector, each raw image of the respective set of raw images described by a light intensity distribution function on the image detector, each raw image associated to an illumination plane of the group of illumination planes;
a means for calculating each provisional image starting from the respective set of raw images.

In particular the computing means is configured for making a combination of provisional images of only two further illumination planes that are arranged at opposite sides of an illumination plane predetermined, in particular distance substantially alike by the illumination plane, the combination defined by the equation:

$$IB(x,y)=I(x,y)-k|I_-(x,y)-I_+(x,y)| \quad [12]$$

wherein $I(x,y)$ is an image calculated at illumination plane $\beta_0$, while $I_-(x,y)$ and $I_+(x,y)$ are provisional images referring to the two further planes $\beta_-,\beta_+$ which are arranged at opposite sides of plane $\beta_0$, and k is a correction coefficient preferably set between 0.5 and 1.

BRIEF DESCRIPTION OF THE DRAWINGS

The invention will be now shown with the description of exemplary embodiments of the method and of the device according to the invention, exemplifying but not limitative, with reference to the attached drawings, in which like reference characters designate the same or similar parts, throughout the figures of which:

FIG. 11 shows an image of the same optical section of FIG. 9 obtained by the method according to the embodiment of the invention by which FIG. 8 is obtained;

FIG. 12 shows an image of the same optical section of FIG. 9 obtained by the method according to the embodiment of the invention by which FIG. 9 is obtained;

DESCRIPTION OF PREFERRED EXEMPLARY EMBODIMENTS

Figure 1:
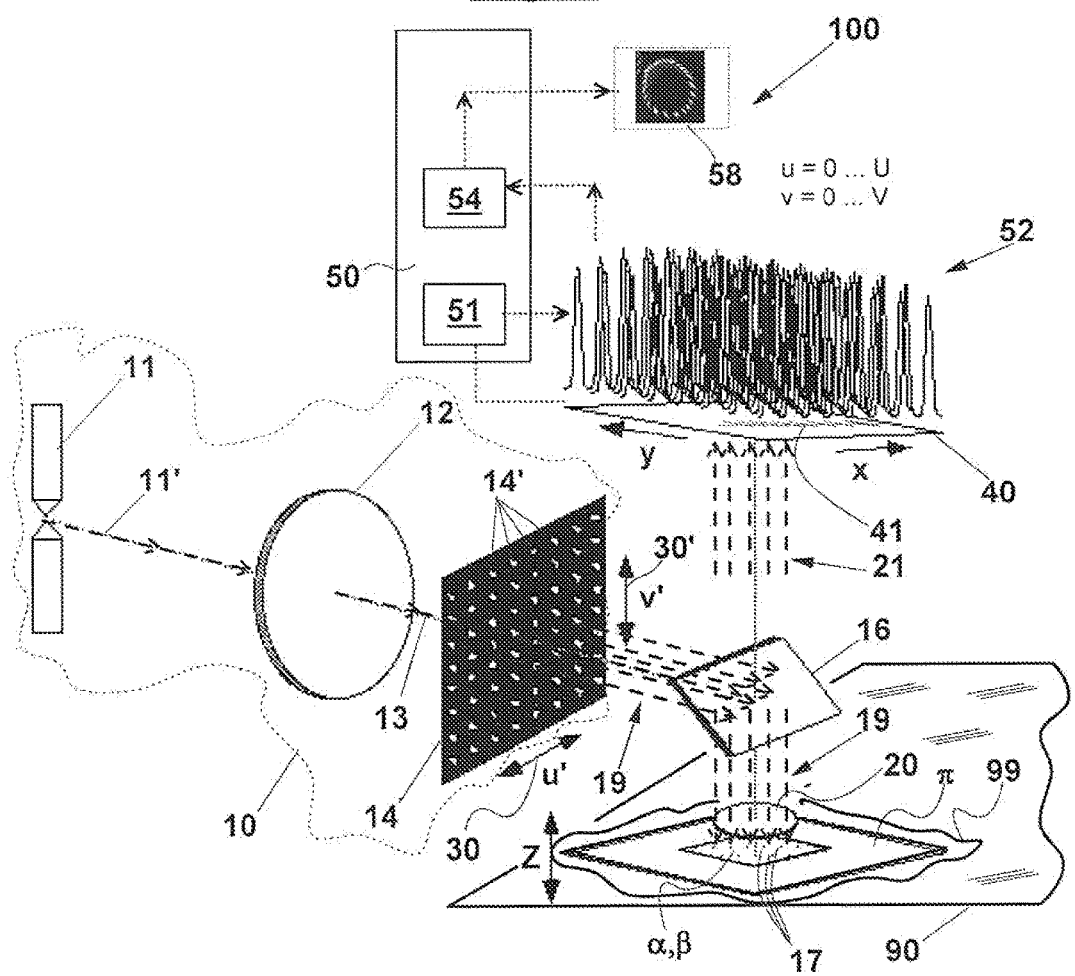
FIG. 1 diagrammatically shows a video-confocal microscopy system for carrying out the method according to the first aspect of the invention.

With reference to FIG. 1, an apparatus 100 is described for obtaining an image of an optical section π of a sample 99, by the method according to the first aspect of the invention, in particular a video-confocal microscope 100 is described. Apparatus 100 comprises elements that are provided by the prior art, and is configured for performing reflection microscopy. However, the scope of the present invention also includes optical arrangements that are suitable for analyzing samples 99 by transmission microscopy and/or by fluorescence microscopy, which can be obtained by modifications of apparatus 100 that are obvious for a skilled person.

Apparatus 100 comprises a means 10 for generating a plurality of light beams 19. In the depicted exemplary embodiment, means 10 for generating light beams 19 comprises a light source 11 and a concentration optical system 12, associated to source 11 that is configured for conveying the light 11' emitted by source 11 in a single light beam 13.

In this exemplary embodiment, the means 10 for generating light beams 19 also comprises a diaphragm 14 that provided with holes 14' that, in this case, are arranged to form an ordered matrix. Diaphragm 14 is adapted to change a light beam that hits one of its own faces into a plurality of parallel light beams coming out of the opposite face. Diaphragm 14 is arranged to receive on an own face, which cannot be seen in FIG. 1, light beam 13 coming from collimator 12, such that the plurality of light beams 19 is obtained from light beam 13, which are arranged in a predetermined illumination pattern. In particular, the illumination pattern is an ordered pattern, in this case a matrix pattern, but the following description also applies to a random pattern.

In this exemplary embodiment, apparatus 100 also comprises a beam divider 16 configured for receiving light beams 19 and for divert them towards a support 90 on which sample 99 is arranged.

Apparatus 100 preferably comprises a means 20 for concentrating light beams 19 in a plurality of spots 17 of an illumination plane β that corresponds, In the exemplary embodiment of FIG. 1, to holes 14' of the lighting system, in this case, of the diaphragm lighting system. Spots 17 form an illumination pattern 18 in illumination plane β.

In this case, illumination plane β crosses a region to be observed of sample 99, in particular plane β is arranged at an optical section of interest of sample 99.

Apparatus 100 also comprises a light sensor means 40, in this case, a wide field sensor means, which is a feature of video-confocal microscopy. The light sensor means may comprise a photoelectric image detector 40, for instance a two-dimensional CCD detector. X,y indicate the coordinates of a plane defined by detector 40.

Apparatus 100 has a scan means for scanning the region to be observed of sample 99, or optical section π of sample 99, as diagrammatically shown by the double arrows 30, 30'. In this exemplary embodiment, the scanner means comprises a translation means 30,30', not shown in detail, for causing a relative translation movement of diaphragm 14 with respect to the unit of source 10 and of collimator 12, for example according to the two alignment directions u',v' holes 14' of matrix diaphragm 14. For example, the translation means may comprise stepper motors.

Due to the diversion of beams 19 in beam divider 19, two translation directions u,v illumination pattern 18 correspond to translation directions u',v' of diaphragm 14 in illumination plane β.

In alternative to diaphragm 14, in a not shown exemplary embodiment, the means 10 for generating light beams 19 and scan means 30,30' may comprise a liquid crystal (LCD) light valve optoelectronic device, and also other devices with no mechanical moving parts such as light emitter arrays that can be programmed by means of suitable signals.

Still with reference to FIG. 1, photoelectric detector 40 is arranged to receive, for each position of illumination pattern 18 in a plane β, a radiation 21 emitted by sample 99 from a region comprising the spots of illumination plane β, in response to light beams 19. As described, the light may be emitted by transmission, by reflection or by fluorescence, provided that the arrangement of detector 40 is modified with respect to support means 90 as obvious to a skilled person.

The operation of such an arrangement, as well as of an arrangement comprising the above-mentioned alternative scan means, is well known by a skilled person and its detailed description will be omitted.

Apparatus 100 also comprises a computing means 50, which include a means 51 for forming a set of raw images 52, each of which is described by a function $I_{u,v}(x,y)$, where the two subscripts u,v, indicates the position of illumination pattern 18 with respect to reference plane $\beta$.

Subscripts u,v indicates the lateral position, i.e. a position that can be attained by a translation movement of illumination pattern 18 parallel to reference plane $\beta_0$. Subscripts u,v take values that depend upon the scan features of scanner means 30', in particular they take a plurality of values set between 0 and U,V, respectively, where 0 refers to a predetermined position of illumination pattern 18 in plane $\beta$, while U,V refer to positions in which each beam has covered the whole distance but one step between this position and the position of an adjacent node of illumination pattern 18 in plane $\beta$, according to the directions x,y, respectively. In particular, subscripts u,v take s−1 and t−1 values set between 0 and U and between 0 and V, respectively, where U and V are the pitches of illumination pattern 18 according to directions u,v, respectively, and s,t are the scan densities along directions u,v.

According to the invention, computing means 50 also comprises a combination means 54 for combining raw images 52, in order to form, i.e. to calculate, a final image 58. The algorithm used for forming final image 58 may be defined by the formula:

$$I(x,y) = m_h(x,y)/[m_2(x,y)^{(h-1)/2}] \quad [2]$$

wherein:
$m_2(x,y) = \text{Avg}\{[I_{u,v}(x,y) - \text{Avg}(I_{u,v}(x,y))]^2\}$;
$m_h(x,y) = \text{Avg}\{[I_{u,v}(x,y) - \text{Avg}(I_{u,v}(x,y))]^h\}$;
h is an integer number $\geq 3$;
$\text{Avg}(I_{u,v}(x,y))$ é the average of the intensity value distribution $(I_{u,v}(x,y) = (\Sigma_{u,v} I_{u,v}(x,y))/U \times V$, u=1 ... U, v=1 ... V, In alternative, the algorithm used for constructing the provisional images may be defined by the formula:

$$IA(x,y) = \Sigma_{i=H', \ldots H''}[c_i \cdot m_i(x,y)/[m_2(x,y)]^{(i-1)/2}] \quad [7]$$

which, if only one coefficient $c_i$ is different from zero, may be one of formulas [3], [4], [5], [6] and similar, which correspond to particular values of i, i.e. to particular orders of the central moment, where the meaning of the symbols is clear from the above.

Figure 2:
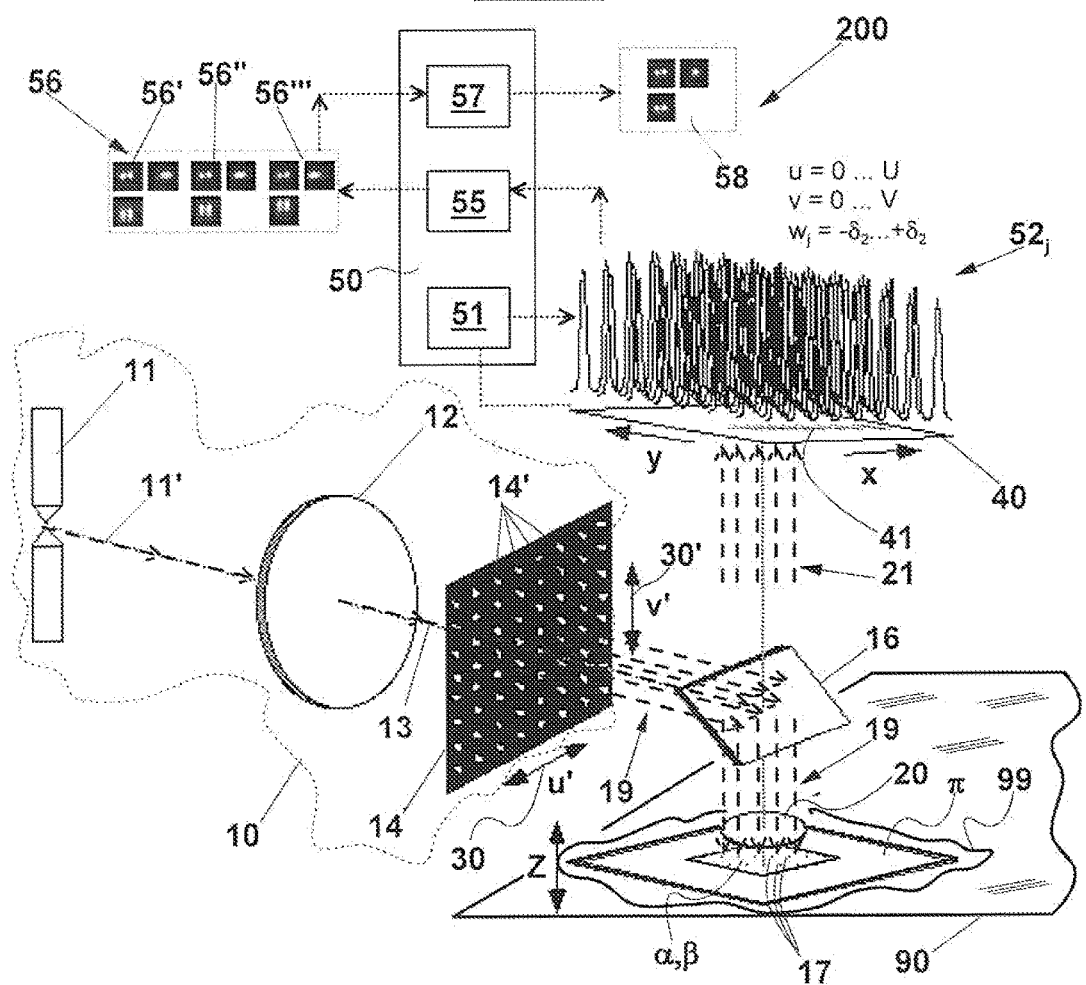
FIG. 2 diagrammatically shows a video-confocal microscopy system for carrying out the method according to the second aspect of the invention.
Figure 3:
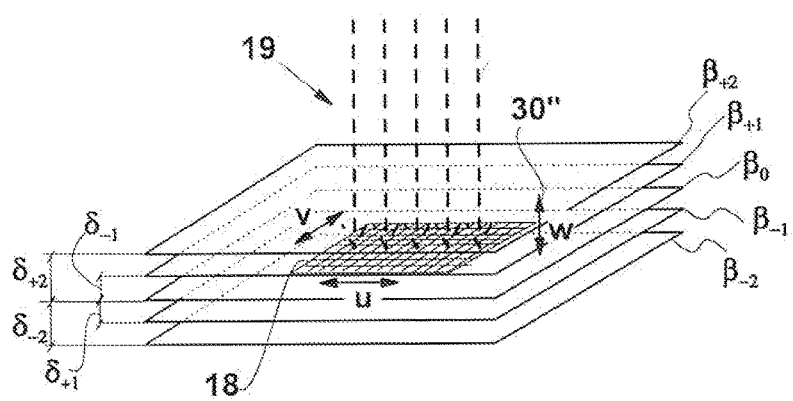
FIGS. 3,4,5 show details of the microscopy system of FIG. 2.

With reference to FIGS. 2 and 3, an apparatus 200 is described to obtain an image of an optical section $\pi$ of a sample 99, by the method for the second aspect of the invention, in particular it is described a video-confocal microscope 200.

FIGS. 2 and 3 show an apparatus 200 according to an exemplary embodiment of a second aspect of the invention. Apparatus 200 comprises a light beam generation means 10, a beam divider, a beam concentration means 20 and image sensor means 40, which may have, independently from one another, one of the forms described with reference to apparatus 100. Apparatus 200 differs from apparatus 100 in that it comprises a scanner means schematically indicated by the double arrow 30" (FIG. 2), for approaching/moving away illumination pattern 18 with respect to illumination plane $\beta$, according to a direction w transverse with respect to said plane. In particular, transverse direction w may be orthogonal to directions u,v, i.e. it may be orthogonal to any illumination plane $\beta_j$. This way, illumination pattern 18 can be brought upon further illumination planes $\beta_i$ that form a group of illumination planes, possibly including reference plane $\beta_0$.

Further illumination planes $\beta_i$ are at respective distance $\delta_i$ from reference plane $\beta_0$. Distance $\delta_i$ is preferably the same order of magnitude as the wavelength $\lambda$ of the waves that form illumination beams 19. At least two of these illumination planes $\beta_i$ are located at opposite sides of a reference plane $\beta_0$, as indicated in FIG. 3. Reference plane $\beta_0$ may be arranged at optical section i.e. at section of interest $\pi$.

In analogy with Apparatus 100, apparatus 200 also comprises a computing means 50 that include a means 51 for forming a set of raw images $52_j$, referring to a particular illumination plane. In this case, each raw image is described by a function indicates $I_{u,v,w_j}(x,y)$, where the three subscripts $u,v,w_j$ indicates the position of illumination pattern 18 with respect to reference plane $\beta_0$. In particular, subscript j or $w_j$ indicates illumination plane $\beta_i$ to which refer raw images $52j$ or $I_{u,v,w_j}(x,y)$ of a group refer.

According to the second aspect of the invention, apparatus 200 differs from apparatus 100 since computing means 50 comprises, instead of means 54 for calculating the final image from raw images 52:

a means 55 for calculating a plurality of provisional images 56 starting from respective sets of raw images 52 $I_{u,v,w_j}(x,y)$, $I_-(x,y)$, $I_+(x,y)$, each of which relates to a specific illumination plane $\beta_0, \beta_j$;

an image combination means 57 for combining images 56 in order to calculate final image 58, in this case, as a combination of these provisional images.

Subscripts j and $w_j$ indicated the axial distance of illumination pattern 18 with respect to plane $\beta_0$, i.e. indicates the position of planes $\beta_i$ that can be attained by a translation movement of illumination pattern 18 according to transverse i.e. axial direction w with respect to reference plane $\beta_0$, in particular according to a direction perpendicular to reference plane $\beta_0$. Subscript $w_j$ takes values $\delta_{-2}$, $\delta_{-1}$, $\delta_0$, $\delta_{+1}$, $\delta_{+2}$, according to the convention used in FIG. 3.

Figure 4:
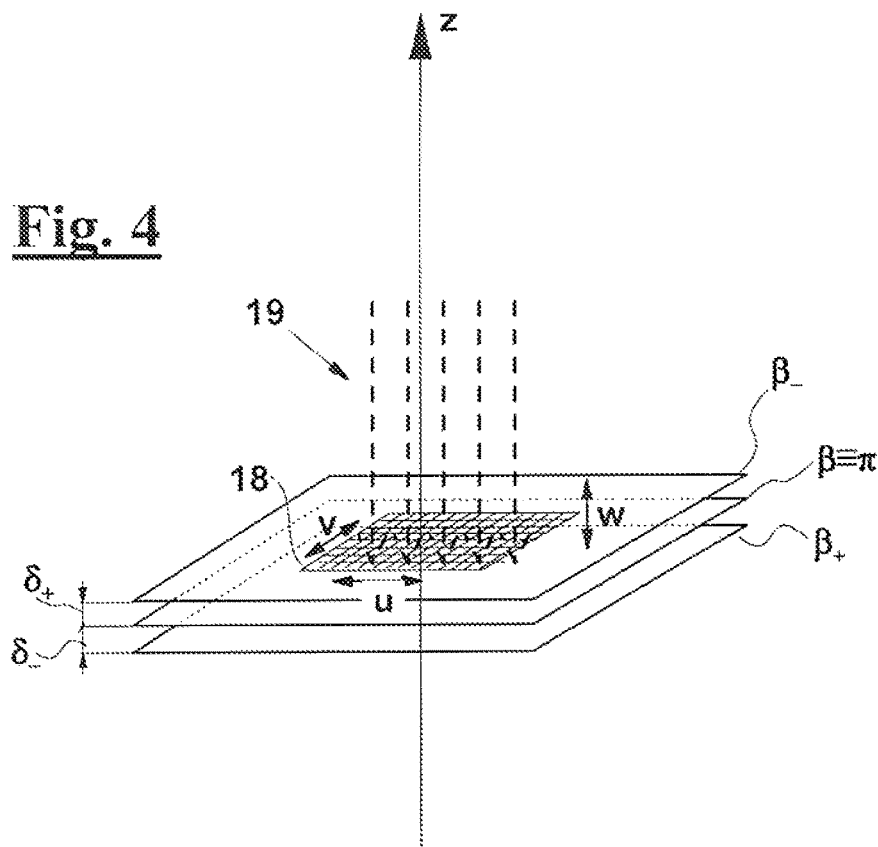

As described, in the exemplary embodiment, as shown, reference plane $\beta_0$ is arranged at optical section of interest $\pi$ of sample 99. As shown in FIG. 4, planes $\beta_i$ may be two, which are therefore arranged at opposite sides of reference plane $\beta$.

The absolute value of $-\delta_1$, $+\delta_2$, or briefly $\delta$, is advantageously the same order of magnitude of the wavelength of the light beams.

For example, in the case of FIG. 4, Image combination means 57 are configured for combining a plurality of provisional images, in this case three provisional images 56', 56", 56''', which are of respective distribution functions I(x, y), $I_-(x,y)$, $I_+(x,y)$ and corresponding in turn to below-focus illumination plane $\beta_-$, to focus illumination reference plane $\beta_0$, i.e. to a plane arranged at optical section of interest $\pi$, and to above-focus illumination plane $\beta_+$. For instance, combination means 57 is configured for calculating final image 58 by the correlation:

$$IB(x,y) = I(x,y) k |I_-(x,y) - I_+(x,y)| \quad [10]$$

The shape of provisional images I(x,y), $I_-(x,y)$, $I_+(x,y)$, i.e. the algorithm used by means 55 for constructing provisional images 56',56",56''' may be, in this case, any algorithm known for creating images starting from raw preliminary images 52, for example one of the algorithms described in EP 0833181 and in U.S. Pat. No. 6,016,367.

In alternative, the algorithm used by means 55 for constructing provisional images 56',56'',56''' may be defined by the formula:

$$I(x,y)=m_h(x,y)/[m_2(x,y)]^{(h-1)/2} \quad [2]$$

and similar for $I_-(x,y)$, $I_+(x,y)$, wherein:
- $m_2(x,y)=\mathrm{Avg}\{[I_{u,v}(x,y)-\mathrm{Avg}(I_{u,v}(x,y))]^2\}$;
- $m_h(x,y)=\mathrm{Avg}\{[I_{u,v}(x,y)-\mathrm{Avg}(I_{u,v}(x,y))]^h\}$;
- h is an integer number $\geq 3$;
- $\mathrm{Avg}(I_{u,v}(x,y))$ the average of the intensity value distribution $I_{u,v}(x,y)=(\Sigma_{u,v}I_{u,v}(x,y)/U\times V$, $u=1\ldots U$, $v=1\ldots V$, In alternative, the algorithm used for constructing the provisional images may be defined by the formula:

$$IA(x,y)=\Sigma_{i=H'\ldots H''}[c_i\cdot m_i(x,y)/[m_2(x,y)]^{(i-1)/2}] \quad [7]$$

which, if one of only the coefficient $c_i$ is different from zero, can correspond to one of formulas [3], [4], [5], [6] and similar, corresponding to a particular value of i, i.e. to a particular order of the central moment.

In other words, in some embodiments means 55 may be configured for executing algorithms as the means 54 of FIG. 1, i.e. may use the first aspect of the invention to obtain provisional images 56',56'',56''' referring to the only illumination planes $\beta_i$.

In alternative, the algorithm used for constructing the provisional images may be defined by the formula:

$$I(x,y)=\max_{u,v}[I(x,y)]-\mathrm{Avg}_{u,v}[I(x,y)] \quad [5]$$

and similar for $I_-(x,y)$, $I_+(x,y)$, where the meaning of the symbols is clear from the above.

Figure 6:
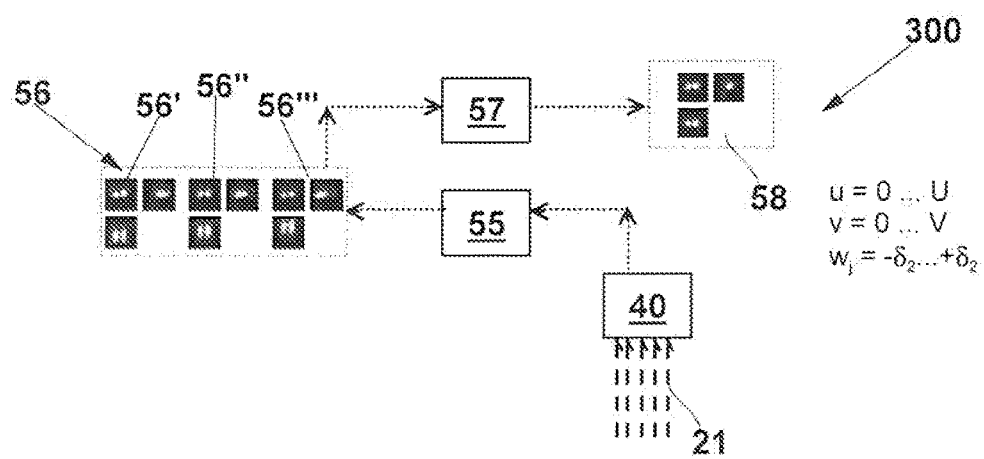
FIG. 6 shows a diagrammatical partial view of a confocal microscopy system for carrying out the method according to the second aspect of the invention.

Even if the method according to the second aspect of the invention has been shown in detail only with reference to apparatus for video-confocal microscopy 200, it may be used in combination with a confocal microscopy apparatus. FIG. 6 is a partial diagrammatical view of a confocal microscopy apparatus 300, where structural differences with respect to apparatus 200 of FIG. 2 are omitted, since they that are obvious and therefore easy to make by a skilled person. Apparatus 300 comprises a means 55 for forming, for each illumination plane, a plurality of planes $\beta_j$ as shown in FIG. 3, and, for each position of a light beam 19, a provisional image $I(x,y)$, $I_-(x,y)$, $I_+(x,y)$ associated to this illumination plane $\beta_j$ starting from light 21 emitted at each plane, and also comprises a computing means 57 for calculating final image 58 from provisional images 56',56'',56''', for instance, by the formula $$IB(x,y)=I(x,y)-k|I_-(x,y)-I_+(x,y)|, \quad [10]$$

where the meaning of the symbols is clear from the above.

EXAMPLES

Some examples of images obtained by the method according to the invention are described below. These images confirm the substantial improvements in the performances that are allowed by the invention, in terms of both lateral and axial spatial resolution.

FIGS. 7 to 20 reproduce images according to the first aspect of the invention, of an optical section of a sample consisting of a fluorescent grain of pollen that have a diameter of about 15 µm, which are obtained by techniques of video-confocal microscopy. The raw or preliminary images have been obtained by a 1,4 NA plan apochromatic objective 4, by an excitation at about 450 nm and a transmission at about 520 nm.

In one example, images are obtained by means of central moments of the light intensity distribution, for example calculated by the formulas that define such values of central moments:

$$m_h(x,y)=\mathrm{Avg}\{[I_{u,v}(x,y)-\mathrm{Avg}(I_{u,v}(x,y))]^h\}, \quad [1]$$

wherein:
- h is an integer number $\geq 3$;
- $\mathrm{Avg}(I_{u,v}(x,y))$ is the average of the intensity value distribution $I_{u,v}(x,y)=[\Sigma_{u,v}I_{u,v}(x,y)]/(U\cdot V)$, $u=1\ldots U$, $v=1\ldots V$.

and where the final image is obtained by the formula:

$$IA_3(x,y)=m_3(x,y)/m_2(x,y) \quad [3].$$

By this technique a spatial resolution higher than 80 nm could be attained, in the case of both compact and scattered samples.

This corresponds to lateral super-resolution factors of about 3 and to axial super-resolution factors of about 7. It has been noticed that the performances achieved even in different applications are comparable or better than the performances declared by the manufacturers of new concept instruments, which are however expensive and not very versatile instruments.

Figure 7:
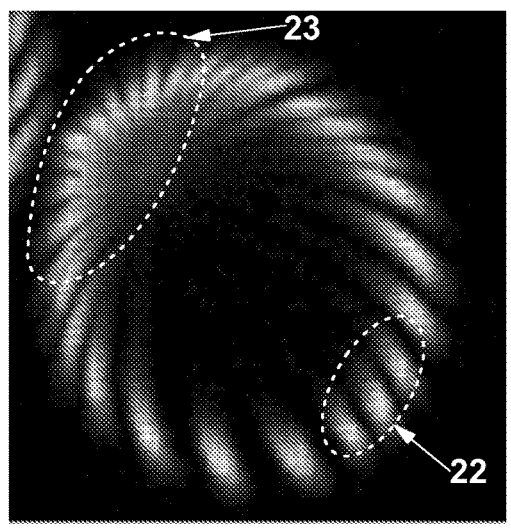
FIG. 7 is an image of an optical section of a sample obtained by video-confocal microscopy according to the prior art, in which the raw images are collected substantially without any random noise.

In FIG. 7 is shown, for purpose of comparison, an image obtained by a well-known video-confocal technique, i.e. by the formula of EP 0833181 and U.S. Pat. No. 6,016,367:

$$I(x,y)=K[\max(x,y)-\min(x,y)-2\mathrm{Avg}(x,y)];$$

Figure 8:
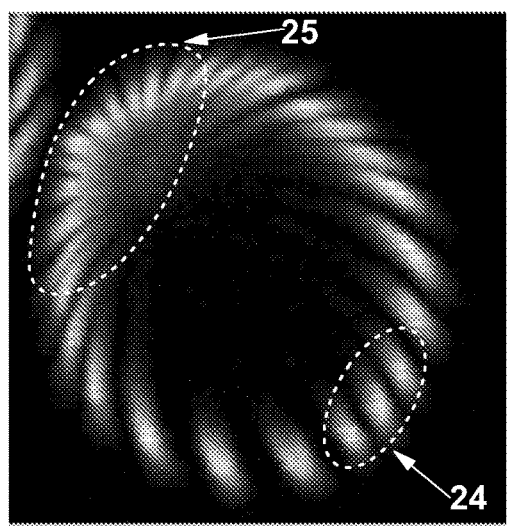
FIG. 8 shows an image of the same optical section of FIG. 7 obtained by the method according to an embodiment of the invention.
Figure 9:
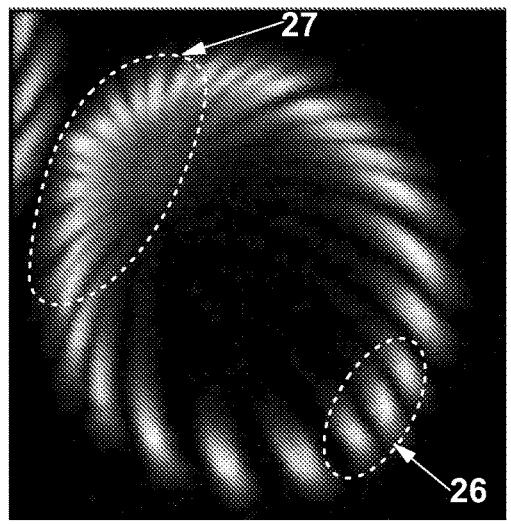
FIG. 9 shows an image of the same optical section of FIG. 7 obtained by the method according to another embodiment of the invention.

FIGS. 8 and 9 show images of the same optical section, but obtained through methods of video-confocal microscopy according to the invention.

In particular, FIG. 8 shows a final image obtained by the formula:

$$IA_3(x,y)=m_3(x,y)/m_2(x,y) \quad [3].$$

These figures show, in comparison to FIG. 7, a lower amount of artifacts due to patterning and to deterministic noise, such as Moiré effect and the like. This is particularly apparent if the regions 24,25 of the image of FIG. 8 are compared with the corresponding regions 22, 23 of the image of FIG. 7.

A further improvement, with respect to the image of FIG. 8, is obtained by combining values of moments of different orders. FIG. 9 shows an image obtained through the expression:

$$IA(x,y)=c_5\cdot m_5(x,y)/[m_2(x,y)]^{2}+c_7\cdot m_7(x,y)/[m_2(x,y)]^{3}+c_9\cdot m_9(x,y)/[m_2(x,y)]^{4} \quad [7']$$

wherein $c_5=0, 48$, $c_7=0, 36$, $c_9=0, 24$, i.e. through a linear combination of the expressions of formulas [4], [5], [6]. Even in this case, improvements were achieved with respect to the images provided by the conventional technique. This is particularly apparent if the regions 26,27 of the image of FIG. 9 are compared with corresponding regions 22,23 of the image of FIG. 7.

Figure 5:
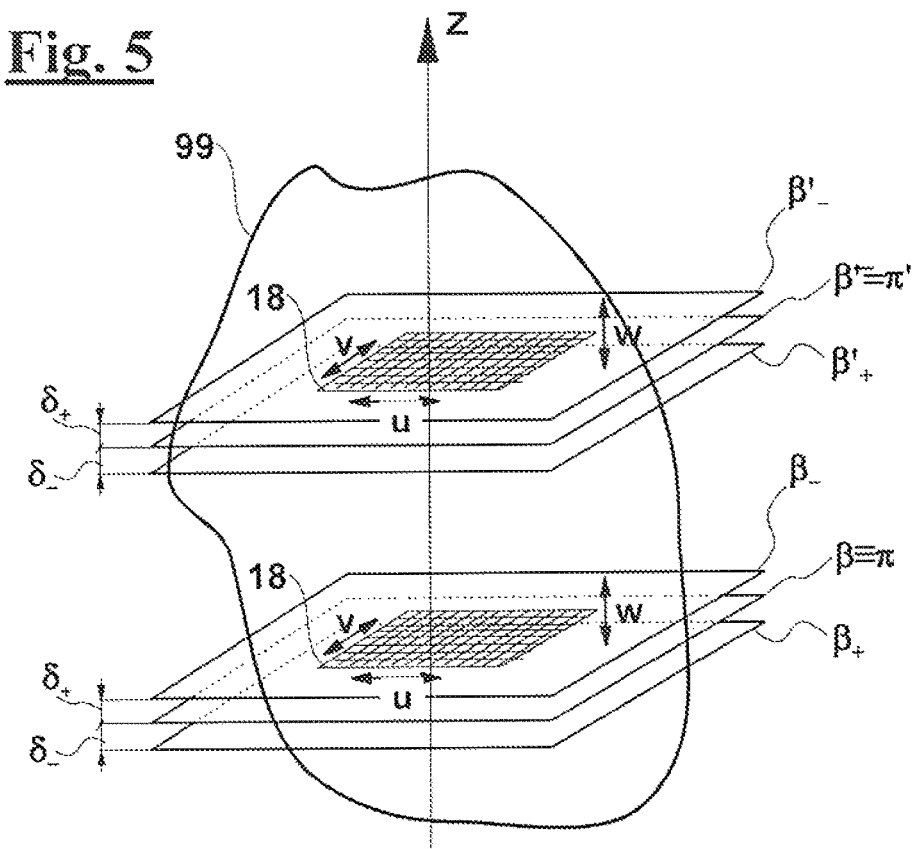
Figure 10:
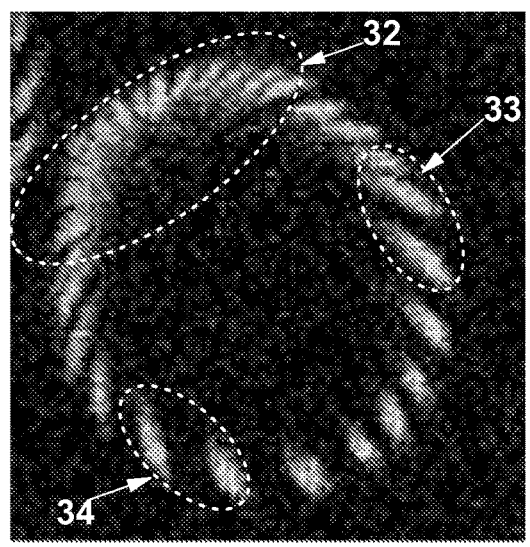
FIG. 10 is an image of an optical section of a sample obtained by video-confocal microscopy according to the prior art, in which the raw images are collected substantially without any random noise.
Figure 11:
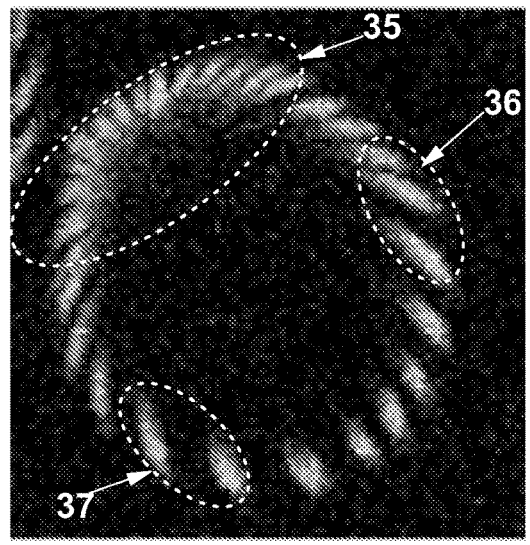
Figure 12:
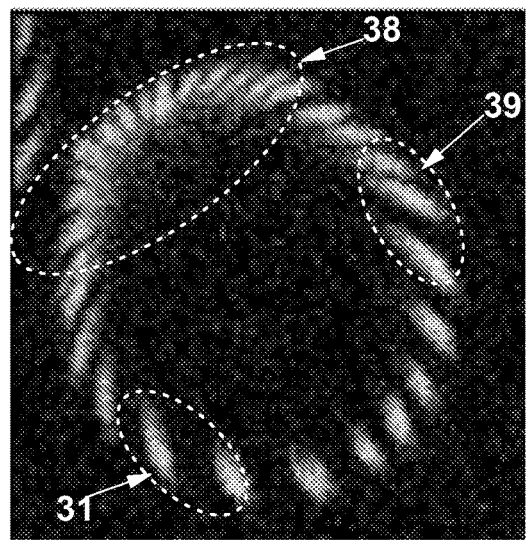

As described, the technique according to the invention produces some advantages, with respect to the prior art, also in the case of images obtained in the presence of random noise. This is shown in FIGS. 10 to 12, which still refer to an optical section of a pollen sample. Like in FIG. 5, FIG. 10 show, for purpose of comparison, an image obtained by a well-known video-confocal technique, i.e. by the formula:

$$I(x,y)=K[\max(x,y)-\min(x,y)-2\mathrm{Avg}(x,y)]$$

in which the raw images have been obtained in the presence of random noise.

FIGS. 11 and 12 show images of the same optical section, but obtained through a video-confocal microscopy method according to the invention.

In particular, FIG. 11 shows an image obtained still by formula [3]. Even in this case, the comparison with the image of FIG. 10 shows a lower amount of artifacts, in particular, by comparing the regions 35,36,37 of the image of FIG. 11 with the corresponding regions 32,33,34 of the image of FIG. 10.

Figure 13:
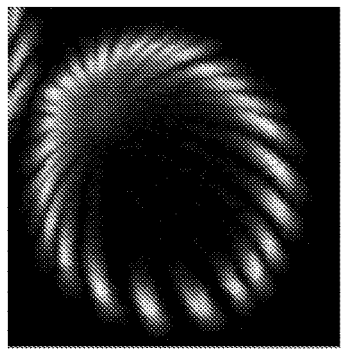
FIGS. 13-16 are images of the same optical section of FIG. 7 obtained by the method according to some embodiments of the invention.
Figure 14:
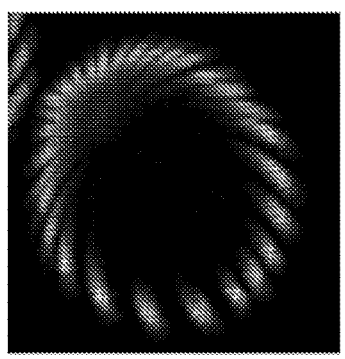
Figure 15:
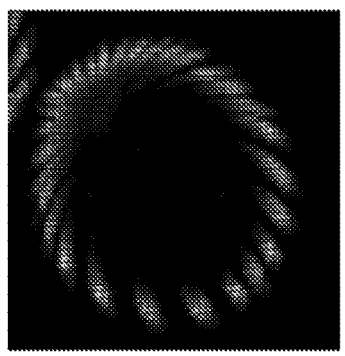
Figure 16:
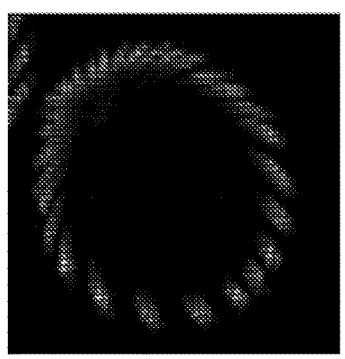

Also in this case, a further improvement is obtained, with respect to the image of FIG. 10, by combining values of moments of different orders. FIG. 12 shows an image obtained through the expression [7'], with the same values of the coefficients. Even in this case, improvements were noticed with respect to the image provided by the conventional technique. This is particularly apparent comparing the regions 38,39,31 of the image of FIG. 12 with corresponding regions 32,33,34 of the image of FIG. 10;

FIGS. 14,15 and 16 reproduce images of the same optical section obtained through the formulas:

$$IA_5(x,y)=m_5(x,y)/(m_2(x,y))^2 \quad [4]$$

$$IA_7(x,y)=m_7(x,y)/(m_2(x,y))^3 \quad [5]$$

$$IA_9(x,y)=m_9(x,y)/(m_2(x,y))^4, \quad [6],$$

respectively, and are shown here as a reference for the image of FIG. 9, which takes advantage of the contributes of these images. In fact, the images of FIGS. 14,15,16 provide several dark areas, since the raw images, on which the calculations are based, were taken at a too low scan density. For comparison, a reduced size version of FIG. 8, obtained by formula [3] is shown in FIG. 13.

Figure 17:
FIGS. 17-20 are images of the same optical section of FIG. 10 obtained by the method according to the embodiment of the invention by which the images of FIGS. 13-16 are obtained.
Figure 18:
Figure 19:
Figure 20:
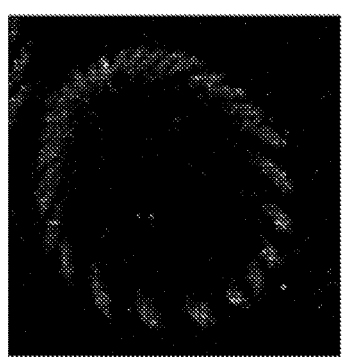

Similar considerations apply for FIGS. 18, 19 and 20, respectively, which are obtained by raw images in the presence of random noise and are shown here as a reference for the image of FIG. 12 that is their linear combination according to equation [7']. For comparison, a reduced size version of FIG. 11, obtained by formula [3], is shown in FIG. 17.

Figure 23:
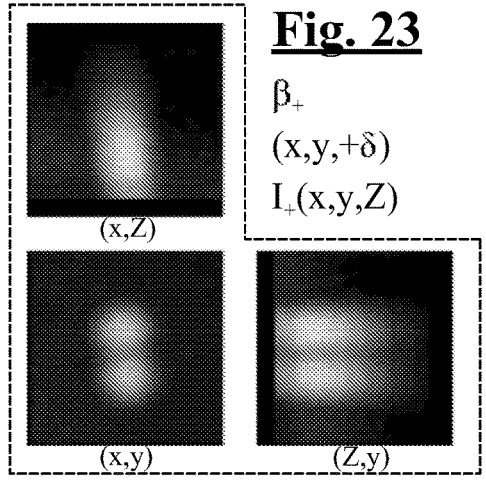
FIGS. 21-23 show plane projections of provisional images used in a method, according to another aspect of the invention, for building a three-dimensional image of a sample.
Figure 22:
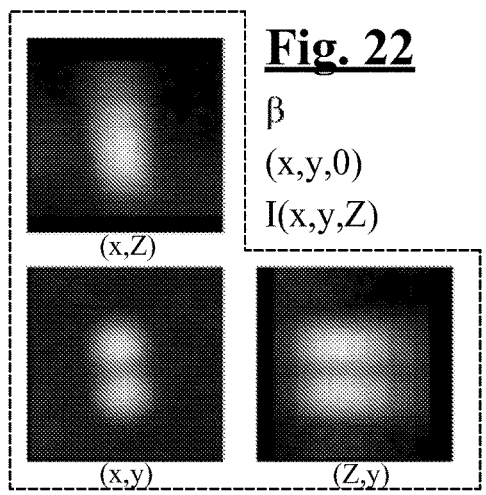
Figure 21:
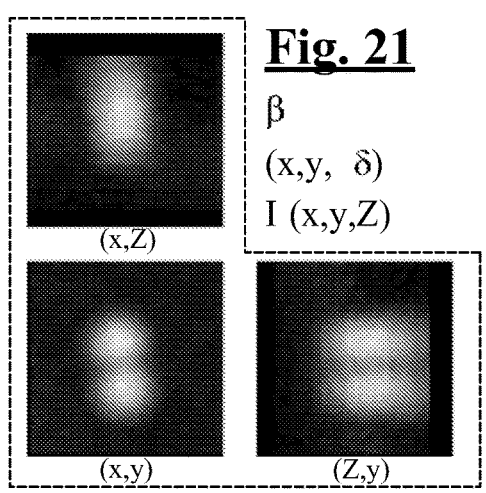

With reference to the second aspect of the invention, in which the final image of an optical section is obtained as a combination 57 of provisional images 56 associated to respective illumination planes selected proximate to the optical section, a sample was arranged that contained fluorescent synthetic balls of the diameter of about 0.5 μm. With reference to the process shown in FIG. 5, three-dimensional images of this sample 99 have been obtained by collecting a suitable number of optical sections π,π' arranged along an axis z orthogonal to each of these optical sections;

FIGS. 21 to 23 reproduce three-dimensional provisional images obtained by respective illumination planes associated to a same optical section z=0. More in detail, these images show respective orthogonal projections according to three reference axes, and are indicated by (x,y), (Z,y) e (x,Z).

In particular, FIG. 22 relates to the projections of a provisional image obtained by an illumination plane β arranged at optical section π, while FIGS. 21 and 23 refer to provisional images obtained by illumination planes β− and β+, respectively, parallel and located at opposite sides of plane β, at respective distances $\delta_-$, $\delta_+$, that are the same order of magnitude as the wavelength used. The provisional images of FIGS. 21-23 were obtained by a method of the present invention, according to the algorithm described by the formula $$IA_3(x,y)=m_3(x,y)/m_2(x,y) \quad [3],$$

where the symbols have the meaning as explained above, even if it is possible to use video-confocal methods of different type, for example the methods described in the present invention or methods known in the prior art or, more in general, methods arranged to make optical sections, for example confocal microscopy methods.

Figure 24:
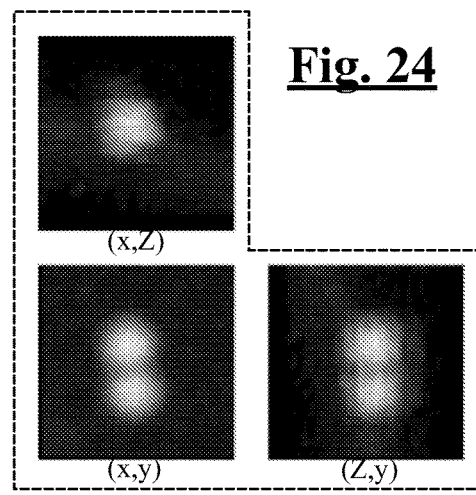
FIG. 24 shows plane projections of an image of the sample of FIGS. 21-23 obtained by combining the provisional images of said figures.

FIG. 24 reproduces a final image obtained as a combination of the provisional images shown in FIGS. 21-23. In this case, the images of FIGS. 21-23 have been obtained by a video-confocal microscopy method still obtained through the formula:

$$IB(x,y)=I(x,y)-k|I_-(x,y)-I_+(x,y)| \quad [10]$$

wherein I−, I and I+ are functions that represent the provisional images of FIGS. 21, 22 and 23, respectively, and k is equal to 0.8.

From FIG. 24 is observed a strong improvement of the axial resolution with respect to what is provided by the provisional images of FIGS. 21-23. In fact, only In the case of FIG. 24 the projections (x, z) and (z, y) substantially show the real geometry of the two balls, while the corresponding projections of the provisional images of FIGS. 21-23 show elongated representations.

Figure 25:
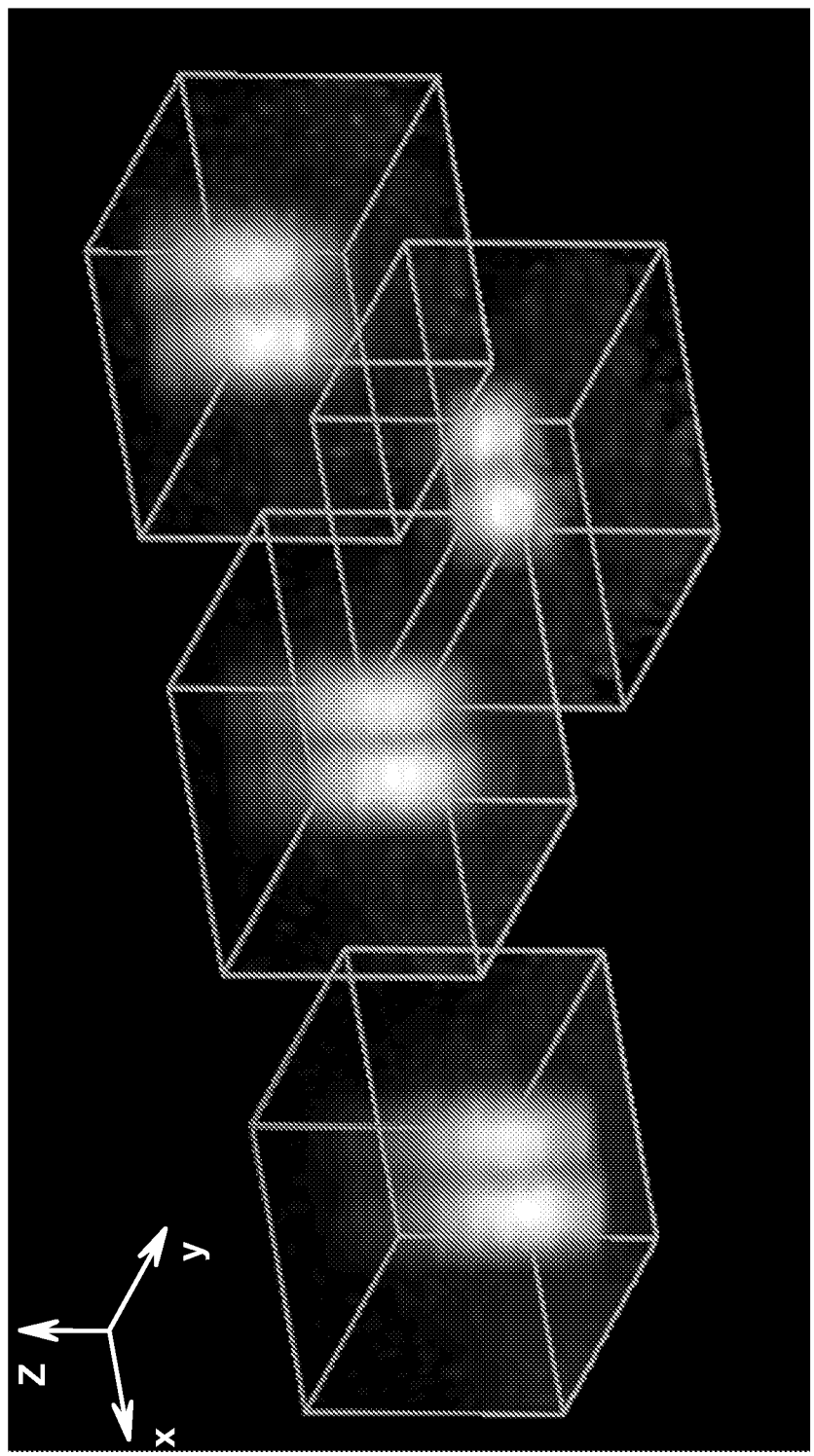
FIG. 25 shows a perspective view of the three-dimensional images of FIGS. 21-24.

FIG. 25 shows three-dimensional images of the whole volume of the sample that correspond to FIGS. 21-24, respectively, which show instead a particular optical section of the sample. The same conclusions can be drawn from FIG. 25 as from FIGS. 21-24

The foregoing description exemplary embodiments of the invention can showing the invention by the or point of view conceptual so that other, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realize the different functions described herein could have a different nature without, for this reason, departing from the field of the invention. S'intende that the expressions or the terminology used have object purely describedvo and, for this, not limitative.

The invention claimed is:

1. A video-confocal microscopy method for creating an image of an optical section of a sample, said method comprising the steps of:
   illuminating a sample by a plurality of light beams concentrated on a plurality of spots of an illumination plane selected at said optical section, said spots arranged according to an illumination pattern;
   scanning said sample with said light beams along said illumination plane, said step of scanning comprising translationally moving said illumination pattern according to directions u,v parallel to said illumination plane, sequentially bringing said illumination pattern to a plurality of positions in said illumination plane;
   for each position of said illumination pattern in said illumination plane, collecting light emitted by said sample in a region comprising said spots in response to said light beams,
   for each position u,v of said illumination pattern, collecting raw images at an image detector comprising light detector elements arranged according to coordinates x,y, each raw image described by a light intensity distribution function $I_{u,v}(x,y)$ on said image detector;
   computing a final image starting from said raw images, wherein said step of computing said final image comprises executing an algorithm configured for calculating, for each element of coordinates x,y, at least one value of a central moment of order ≥3 of said light intensity distribution, at each coordinate x,y said central moment $m_i(x,y)$ of order ≥3 having a value depending upon the asymmetry of the intensity values distribution of each raw image versus said position of said illumination pattern, wherein said central moment is defined as:

$$m_h(x,y) = \text{Avg}\{[I_{u,v}(x,y) - \text{Avg}(I_{u,v}(x,y))]^h\}, \quad [1]$$

wherein:

h is an integer number ≥3;

$\text{Avg}(I_{u,v}(x,y))$ is the average of the intensity value distribution $I_{u,v}(x,y)$, i.e. it is equal to $(\Sigma_{u,v} I_{u,v}(x,y))/(U \times V)$, $u=1 \ldots U$, $v=1 \ldots V$ wherein $\text{Avg}(I_{u,v}(x,y))$ is, for each element of said detector, the average of the intensity values obtained for all the positions u,v of said illumination pattern, such that said final image has a higher intensity at coordinates x,y that correspond to positions where a critically focused part of said sample is present.

2. The method according to claim 1, wherein said algorithm is defined by the equation:

$$IA(x,y) = \Sigma_{i=H'\ldots H''}[c_i \cdot m_i(x,y)/[m_2(x,y)]^{(i-1)/2}] \quad [7]$$

wherein:

$m_i(x,y) = \text{Avg}\{[I_{u,v}(x,y) - \text{Avg}(I_{u,v}(x,y))]^i\}$ $H'$, $H''$ are integer numbers, $c_i$ are coefficient wherein at least one of said coefficient $c_i$ is different from zero;

$m_i(x,y)$ is a value of a central moment of order i of said light intensity distribution;

$m_2(x,y) = \text{Avg}\{[I_{u,v}(x,y) - \text{Avg}(I_{u,v}(x,y))]^2\}$.

3. The method according to claim 1, wherein said algorithm is defined by the equation:

$$IA_h(x,y) = m_h(x,y)/[m_2(x,y)]^{(h-1)/2} \quad [2]$$

wherein:

$m_2(x,y) = \text{Avg}\{[I_{u,v}(x,y) - \text{Avg}(I_{u,v}(x,y))]^2\}$;

$m_h(x,y)$ is a value of a central moment of order h of said light intensity distribution.

4. The method according to claim 1, wherein said algorithm is defined by the formula:

$$IA_3(x,y) = m_3(x,y)/m_2(x,y) \quad [3]$$

wherein $m_3(x,y)$ is a value of the central moment of order 3 of said light intensity distribution.

5. The method according to claim 1, wherein said algorithm is defined by the equation:

$$IA_h(x,y) = m_h(x,y)/[m^2(x,y)]^{(h-1)/2} \quad [2],$$

wherein:

$m_2(x,y) = \text{Avg}\{[I_{u,v}(x,y) - \text{Avg}(I_{u,v}(x,y))]^2\}$;

$m_h(x,y)$ is a value of a central moment of order h of said light intensity distribution, wherein h is an odd integer number ≥5.

6. The method according to claim 1, wherein said algorithm is described by a formula selected from the group consisting of:

$$IA_5(x,y) = m_5(x,y)/[m_2(x,y)]^2 \quad [4]$$

$$IA_7(x,y) = m_7(x,y)/[m_2(x,y)]^3 \quad [5]$$

$$IA_9(x,y) = m_9(x,y)/[m_2(x,y)]^4 \quad [6].$$

7. The method according to claim 1, also comprising a step of:

selecting a plurality of further illumination planes, comprising at least two further illumination planes that are arranged at opposite sides of said optical section, said further illumination planes located at a respective distance from said optical section that are shorter than a predetermined maximum distance, wherein said maximum distance is the same order of magnitude as the wavelength of said light beams;

wherein, for each further illumination plane of said plurality of further illumination planes, the method comprises the steps of:

illuminating said sample by a plurality of light beams concentrated on a plurality of spots of each further illumination plane, said spots arranged in a respective illumination pattern;

scanning said sample with said light beams along said illumination plane, said step of scanning comprising translationally moving said respective illumination pattern according to directions u,v parallel to each further illumination plane, sequentially bringing said respective illumination pattern to a plurality of positions on each further illumination plane;

for each position $u,v,w_j$ of said respective illumination pattern on each further illumination plane, collecting light emitted from said sample in a region comprising said spots of each further illumination plane in response to said light beams;

for each position $u,v,w_j$ of said respective illumination pattern, collecting further raw images, each further raw image described by a light intensity distribution function $I_{u,v,w_j}(x,y)$ on said image detector, computing a provisional image associated to each further illumination plane starting from said further raw images, wherein said step of computing a provisional image comprises executing an algorithm that provides computing a value of a central moment of order ≥3 of said light intensity distribution, computing a final image as a combination of said provisional images.

8. The method according to claim 7, comprising a step of translationally moving a same illumination pattern according to a direction transverse to said optical section, wherein said illumination pattern is sequentially shifted between said illumination plane at said optical section and each of said further illumination planes, and said step of scanning the sample is sequentially carried out along each of said illumination planes.

9. The method according to claim 8, wherein said transverse direction is a direction orthogonal to said optical section.

10. The method according to claim 7, wherein said plurality of further illumination planes comprises only said two further illumination planes that are arranged at opposite sides of said optical section.

11. The method according to claim 10, wherein said two further illumination planes are arranged at about the same distance from said optical section.

12. The method according to claim 10, wherein said combination of said provisional images is defined by the equation:

$$IB(x,y) = IA(x,y) - k|IA_-(x,y) - IA_+(x,y)| \quad [8],$$

wherein IA_(x,y) and IA_+(x,y) are provisional images of said two planes that are arranged at opposite sides of said optical section, and k is a number set between 0.5 and 1.

13. The method according to claim 12, wherein said provisional images IA_(x,y) and IA_+(x,y) are calculated by an algorithm defined by the formulas:

$$IA_+(x,y)=m_{h+}(x,y)/[(m_{2+}(x,y))]^{(h-1)/2} \qquad [2'],$$

and $$IA_-(x,y)=m_{h-}(x,y)/[(m_{2-}(x,y))]^{(h-1)/2} \qquad [2''].$$

14. The method according to claim 12, wherein said provisional images IA_(x,y) and IA_+(x,y) are calculated by an algorithm defined by respective combinations of values of central moments of the light intensity distribution.

15. The method according to claim 12, wherein said provisional images IA_(x,y) and IA_+(x,y) are calculated by an algorithm defined by respective linear combinations of central moments of the light intensity distribution, i.e.:

$$IA_+(x,y)=\Sigma_{i=H'\ldots H''}[c_i \cdot m_{i+}(x,y)/[m_{2+}(x,y)]^{(i-1)/2}] \qquad [7'],$$

and $$IA_-(x,y)=\Sigma_{i=H'\ldots H''}[c_i \cdot m_{i-}(x,y)/[m_{2-}(x,y)]^{(i-1)/2}] \qquad [7''].$$

16. The method according to claim 10, wherein said step of computing said final image is carried out by an algorithm defined by formula [8], wherein h is an odd integer number ≥3.

17. The method according to claim 16, wherein h is selected among 3, 5, 7 and 9.

18. A confocal microscopy method for creating an image of a cross section of interest of a sample, said method comprising the steps of:
  selecting a group of illumination planes, at least two of said illumination planes arranged at opposite sides of said section of interest, said illumination planes located at respective distances from said section of interest shorter than a predetermined maximum distance,
  for each illumination plane of said group of illumination planes, steps of:
  illuminating said sample with at least one light beam concentrated on a spot of each illumination plane;
  scanning said sample with said at least one light beam on each illumination plane, according to directions u,v parallel to each illumination plane, sequentially bringing said light beam to a plurality of positions on each illumination plane;
  for each position u,v,$w_j$ of said respective beam on each illumination plane, collecting light emitted by said sample in a region comprising said spot of each illumination plane, in response to said at least one light beam;
  for each position u,v,$w_j$ of said respective beam, creating a provisional image associated to said illumination plane at a light detector, said provisional image described by a light intensity distribution function on said spot;
wherein said maximum distance is the same order of magnitude as the wavelength of said light beams;
  computing a final image as a combination of provisional images.

19. The method according to claim 18, wherein, for a video-confocal application:
  said step of illuminating is carried out by a plurality of light beams concentrated on respective spots of a plurality of spots of each illumination plane, said spots arranged in a respective illumination pattern;
  said step of scanning said sample comprises translationally moving said illumination pattern according to said directions u,v, in order to sequentially bringing said illumination pattern to said plurality of positions on each illumination plane;
  said step of creating a provisional image comprises the steps of:
  for each position u,v,$w_j$ of said respective illumination pattern, collecting a respective set of raw images at an image detector, each raw image of said respective set of raw images described by a light intensity distribution function on said image detector, each raw image associated to an illumination plane said group of illumination planes;
  computing said provisional image associated to said illumination plane starting from said respective set of raw images.

20. The method according to claim 19, comprising a step of translationally moving a same illumination pattern according to a direction transverse to said section of interest, wherein said same illumination pattern is sequentially shifted between said illumination planes, and said step of scanning said sample is sequentially carried out along each of said illumination planes.

21. The method according to claim 20, wherein said transverse direction is a direction orthogonal to said section of interest.

22. The method according to claim 18, wherein said group of illumination planes comprises an illumination plane selected at said section of interest.

23. The method according to claim 18, wherein said group of illumination planes comprises, at a predetermined distance from said section of interest, only said two illumination planes that are arranged at opposite sides of said section of interest.

24. The method according to claim 23, wherein said two further illumination planes are arranged at about the same distance from said section of interest.

25. The method according to claim 22, wherein said combination of provisional images is defined by the equation:

$$IB(x,y)=I(x,y)-k|I_-(x,y)-I_+(x,y)| \qquad [10]$$

wherein I(x,y) is an image calculated at said illumination plane selected at said section of interest, and I_(x,y) and I_+(x,y) are provisional images of said two planes at opposite sides of said section of interest, and k is a number set between 0.5 and 1.

26. The method according to claim 25, wherein said provisional images are calculated by an algorithm defined by the formulas:

$$IA_+(x,y)=m_{h+}(x,y)/[(m_{2+}(x,y))]^{(h-1)/2} \qquad [2'],$$

and $$IA_-(x,y)=m_{h-}(x,y)/[(m_{2-}(x,y))]^{(h-1)/2} \qquad [2''].$$

27. The method according to claim 25, wherein said provisional images are calculated by an algorithm defined by respective combinations of values of central moments of said light intensity distribution.

28. The method according to claim 25, wherein said provisional images are calculated by an algorithm defined by the formulas:

$$IA_+(x,y)=\Sigma_{i=H'\ldots H''}[c_i \cdot m_{i+}(x,y)/[m_{2+}(x,y)]^{(i-1)/2}] \qquad [7'],$$

and $$IA_-(x,y)=\Sigma_{i=H'\ldots H''}[c_i \cdot m_{i-}(x,y)/[m_{2-}(x,y)]^{(i-1)/2}] \quad [7''].$$

29. A confocal microscopy apparatus comprising:
a support for a sample;
a light source configured to generate at least one light beam;
a light concentrator configured to generate said at least one light beam on a spot of an illumination plane selected proximate to said support;
a scanner configured to translate said at least one beam according to directions u,v parallel to said illumination plane, said scanner configured for sequentially bringing said beam to a plurality of positions u,v in said illumination plane;
a light collector for collecting light emitted by said sample in a region comprising said spot of said illumination plane, said apparatus configured for receiving from said sample light emitted by said sample as reflected and/or transmitted and/or fluorescent light; a computer configured to form, for each position of said light beam, a provisional image associated to said illumination plane starting from said emitted light, said provisional image described by a light intensity distribution function on said spot;
a computer configured to compute a final image from said provisional images;
wherein said scanner also comprises a axial translator arranged for translating said pattern and said illumination plane according to a direction transverse to said illumination plane, bringing said at least one light beam to a plurality of further illumination planes at respective distances shorter than a predetermined maximum distance, wherein said computer is configured for calculating said final image as a combination of a plurality of provisional images that are calculated starting from respective sets of raw images of respective illumination planes; and
wherein said combination is defined by the equation:

$$IB(x,y)=I(x,y)-k|I_-(x,y)-I_+(x,y)|$$

wherein I(x,y) is an image calculated at said illumination plane selected at a section of interest of said sample, while I_(x,y) and I_+(x,y) are provisional images of said two further planes at opposite sides of said section of interest, and k is a number set between 0.5 and 1.

30. The apparatus according to claim 29, wherein:
said light source is configured for generating a plurality of light beams;
said light concentrator is configured for concentrating said light beams of said plurality of light beams on a spot of said illumination plane, said spots arranged in a respective illumination pattern, such that said scanner is configured for translating said illumination pattern according to said directions u,v, in order to sequentially bringing said illumination pattern to said plurality of positions on each illumination plane;
said computer configured to form said provisional image generates, for each position u,v,w of said illumination pattern, a respective set of raw images at an image detector, each raw image of said respective set of raw images described by a light intensity distribution function on said image detector, each raw image associated to an illumination plane of said group of illumination planes; and
calculates each provisional image starting from said respective set of raw images.

31. The apparatus according to claim 29, wherein said computer configured to form said provisional image generates a combination of only two further illumination planes that are arranged at opposite sides of a predetermined illumination plane.

32. The apparatus according to claim 29, wherein said distances from the predetermined illumination plane are substantially the same distance.

33. The apparatus according to claim 29, wherein said two further illumination planes are arranged at about the same distance from said section of interest.

* * * * *